US012686349B2

(12) United States Patent
Daley

(10) Patent No.: US 12,686,349 B2
(45) Date of Patent: Jul. 21, 2026

(54) WIND ENERGY BASED 12-VOLT CHARGING SYSTEM FOR ELECTRIC VEHICLES

(71) Applicant: Jeremy Daley, Lawson, MO (US)

(72) Inventor: Jeremy Daley, Lawson, MO (US)

( * ) Notice: Subject to any disclaimer, the term of this patent is extended or adjusted under 35 U.S.C. 154(b) by 678 days.

(21) Appl. No.: 18/314,222

(22) Filed: May 9, 2023

(65) Prior Publication Data

US 2023/0365083 A1 Nov. 16, 2023

Related U.S. Application Data

(60) Provisional application No. 63/340,010, filed on May 10, 2022.

(51) Int. Cl.
B60R 16/033 (2006.01)
F03D 9/32 (2016.01)
H02K 7/18 (2006.01)

(52) U.S. Cl.
CPC .............. B60R 16/033 (2013.01); F03D 9/32 (2016.05); H02K 7/183 (2013.01); F05B 2240/941 (2013.01)

(58) Field of Classification Search
CPC ......... B60R 16/033; F03D 9/32; H02K 7/183; F05B 2240/941
See application file for complete search history.

(56) References Cited

U.S. PATENT DOCUMENTS

| | | | |
|---|---|---|---|
| 3,876,925 A | 4/1975 | Stoeckert | |
| 5,920,127 A | 7/1999 | Damron | |
| 6,897,575 B1 | 5/2005 | Yu | |
| 7,665,554 B1 * | 2/2010 | Walsh ...................... | F03D 9/32 |
| | | | 180/2.2 |
| 2006/0210400 A1 | 9/2006 | Hampl | |
| 2008/0179114 A1 | 7/2008 | Chen | |
| 2011/0156404 A1 | 6/2011 | Haddad | |
| 2020/0055403 A1 * | 2/2020 | Overstreet ................ | F03D 9/32 |
| 2022/0118873 A1 * | 4/2022 | Henry .................... | B60L 8/006 |
| 2023/0226935 A1 * | 7/2023 | Barrera ................... | B60L 53/22 |
| | | | 320/104 |

* cited by examiner

*Primary Examiner* — Edwin A Young
(74) *Attorney, Agent, or Firm* — Brennan, Manna & Diamond, LLC

(57) ABSTRACT

A charging device for providing power to 12-Volt circuits of an electric vehicle. The charging device comprises a cylindrical fan having a plurality of blades extending radially from an outer surface thereof, a winding connected to an inner surface of the fan and wrapped around an armature. The fan spins when the vehicle is in motion enabling the winding and armature to generate electricity. The electricity is provided to a vehicle's 12-Volt battery or directly to 12-Volt circuits of the vehicle. The charging device can be positioned at any appropriate position on the vehicle and can be integrated or retrofitted.

20 Claims, 6 Drawing Sheets

WIND ENERGY BASED 12-VOLT CHARGING SYSTEM FOR ELECTRIC VEHICLES

CROSS-REFERENCE TO RELATED APPLICATION

The present application claims priority to, and the benefit of, U.S. Provisional Application No. 63/340,010, which was filed on May 10, 2022 and is incorporated herein by reference in its entirety.

FIELD OF THE INVENTION

The present invention generally relates to the field of electric vehicle (EV) recharging systems. More specifically, the present invention relates to a novel 12-Volt charging device for recharging and providing power to 12-Volt circuits and components of an electric vehicle. The device uses wind energy and reduces a vehicle's main battery depletion. As a result, the device increases a driving range of the vehicle, thereby reducing the number of times to stop and locate charging stations on the road. Accordingly, the present disclosure makes specific reference thereto. Nonetheless, it is to be appreciated that aspects of the present invention are also equally applicable to other like applications, devices, and methods of manufacture.

BACKGROUND

By way of background, electric or hybrid electric vehicles use high voltage batteries such as a high voltage lithium-ion battery. The high voltage battery is used for propulsion in high voltage ranging from 400V-800V and even higher. Further, such vehicles use a 12-Volt system powered by a 12-Volt battery acting as a second power source. The 12-Volt system or circuit is used for electrical vehicle's (EV's) electrical devices including but not limited to the electronic control unit (ECU), infotainment system, power door locks, power windows, HVAC fan, and safety systems including airbags and ADAS technology. Separate high voltage battery pack and 12-Volt battery enables to safely disconnect the high voltage from the low voltage when the vehicle is not being driven or in the event of a crash. Many manufacturers use lead-acid 12-Volt batteries but some automotive manufacturers such as Tesla uses lithium-ion 12-Volt battery.

Currently, electric cars use a converter that draws electric current from the large battery pack to recharge the 12-Volt battery. The converter steps down the voltage from 400V/800V to around 14V to recharge the 12-Volt battery. However, it decreases the power and life of the large battery pack and vehicles may face problem in transferring current from the large battery pack. This also causes lower range of motion of the electric vehicles and people need to stop frequently on charging stations for recharging battery pack.

Many times, the voltage converted from the large battery pack is less than 12.9V which prevents the charging of the 12-Volt battery. The 12-Volt battery may also degrade faster due to uneven charging provided by the large battery pack. There can be cases where the 12-Volt battery does not have the power which may disconnect the contactor preventing disconnection of the high-powered battery in the event of a collision. Also, a high voltage battery pack is not safe for providing power to a 12-Volt system of electric vehicles and hybrid vehicles. People desire an improved device and way of recharging and accommodating 12-Volt circuits/battery in an electric vehicle.

Therefore, there exists a long felt need in the art for a charging device capable of charging 12-Volt circuits and systems of an electric vehicle. There is also a long felt need in the art for a charging device that safely and effectively charges 12-Volt battery of an electric vehicle. Additionally, there is a long felt need in the art for a 12-Volt system charging device for an electric vehicle that eliminates flow of electric current from the large battery pack of the electric vehicle to charge 12-Volt battery and accommodate 12-Volt circuits. Moreover, there is a long felt need in the art for a 12-Volt system charging device that reduces battery depletion to maintain optimal travel range for electric vehicles. Further, there is a long felt need in the art for an electric vehicle 12-Volt charger system that generates electricity to provide power to the 12-Volt system without requiring connection with large battery packs. Furthermore, there is a long felt need in the art for a charging device that can be integrated or retrofitted to any electric or hybrid vehicle. Finally, there is a long felt need in the art for an improved charging device for the 12-Volt system of an electric vehicle that increases range of electric vehicles by obviating dependency on large battery pack for accommodating 12-Volt systems and circuits.

The subject matter disclosed and claimed herein, in one embodiment thereof, comprises a regenerative charging device for 12-Volt circuits in an electric vehicle. The charging device is configured to be placed on an exterior or an interior of the vehicle, and uses wind energy for generating electric power. The device has a cylindrical fan having a plurality of blades on the exterior surface thereof that spin while the vehicle is in motion. The charging device has a generator winding inside the hollow fan and is wrapped around an armature, wherein the winding rotates around the armature to generate electric power to recharge and provide power to the 12-Volt circuits. The device is installed using a pair of brackets fastened using fasteners. The device is connected to 12-Volt circuits either directly or provides power to a 12-Volt battery of the vehicle.

In this manner, the regenerative charging device of the present invention accomplishes all of the forgoing objectives and provides users with a charging device capable of accommodating 12-Volt circuits in an electric vehicle. The device offloads charging requirement from main battery and thus increases range of the vehicle. The device utilizes wind power via a fan that spins while the vehicle is in motion to generate electricity and thus is environment-friendly. The device reduces battery depletion to maintain optimal travel range for electric vehicles.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a 12-Volt system charging device for electric vehicles. The charging device further comprising a cylindrical shaped fan assembly, the fan having a hollow body and having a plurality of blades extending radially outward from the exterior surface thereof; a generator armature disposed in the fan assembly and surrounded longitudinally by a generator winding, the inner surface of the fan assembly attached to the generator winding, wherein the fan assembly rotates along the armature when the vehicle is in motion for generating electricity. The charging device is internally connected to 12-Volt battery of the vehicle for providing electric current to recharge the 12-Volt battery.

In a further embodiment of the present invention, an electric vehicle with a charging device for 12-Volt circuits is disclosed. The electric vehicle includes a high-power propulsion battery for providing propulsion power to the electric vehicle, a 12-Volt battery for providing electric power to internal electric components of the vehicle, the charging device is configured to use wind energy during motion of the vehicle for generating electric charge, the charging is positioned on the front or the rear of the vehicle, wherein the charging device is coupled to the 12-Volt battery for providing 12-V electric current to recharge the 12-Volt battery. The charging device includes a fan having blades which rotate during motion of the vehicle enabling a winding to rotate around an armature for generating electric current.

In a further embodiment of the present invention, a charging device for 12-Volt circuits in an electric vehicle is disclosed. The charging device is configured to be placed on the vehicle, such as the spoiler mounted on the trunk of a vehicle, and has a cylindrical fan having a plurality of blades that spin while the vehicle is in motion to generate electricity to the 12-Volt system in the vehicle. The charging device has generator winding inside the hollow fan that is wrapped around an armature, wherein the winding rotates around the armature to generate electric power to recharge and provide power to the 12-Volt circuits. The device is installed using a pair of brackets fastened using fasteners.

In a further embodiment of the present invention, a method of increasing range of an electric vehicle by off-loading electric power requirements of 12-Volt components of the electric vehicle from high-power battery of the vehicle is described. The method comprising the steps of installing a charging device on the vehicle, the charging device uses wind energy to rotate a fan which rotates a winding around an armature for generating electric power, connecting the charging device with the 12-Volt components, wherein the generated electric power is provided to the 12-Volt components and therefore, obviating the requirement of providing power from the high-power battery of the vehicle.

In yet another embodiment, the charging device can be integrated or retrofitted to the vehicle.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
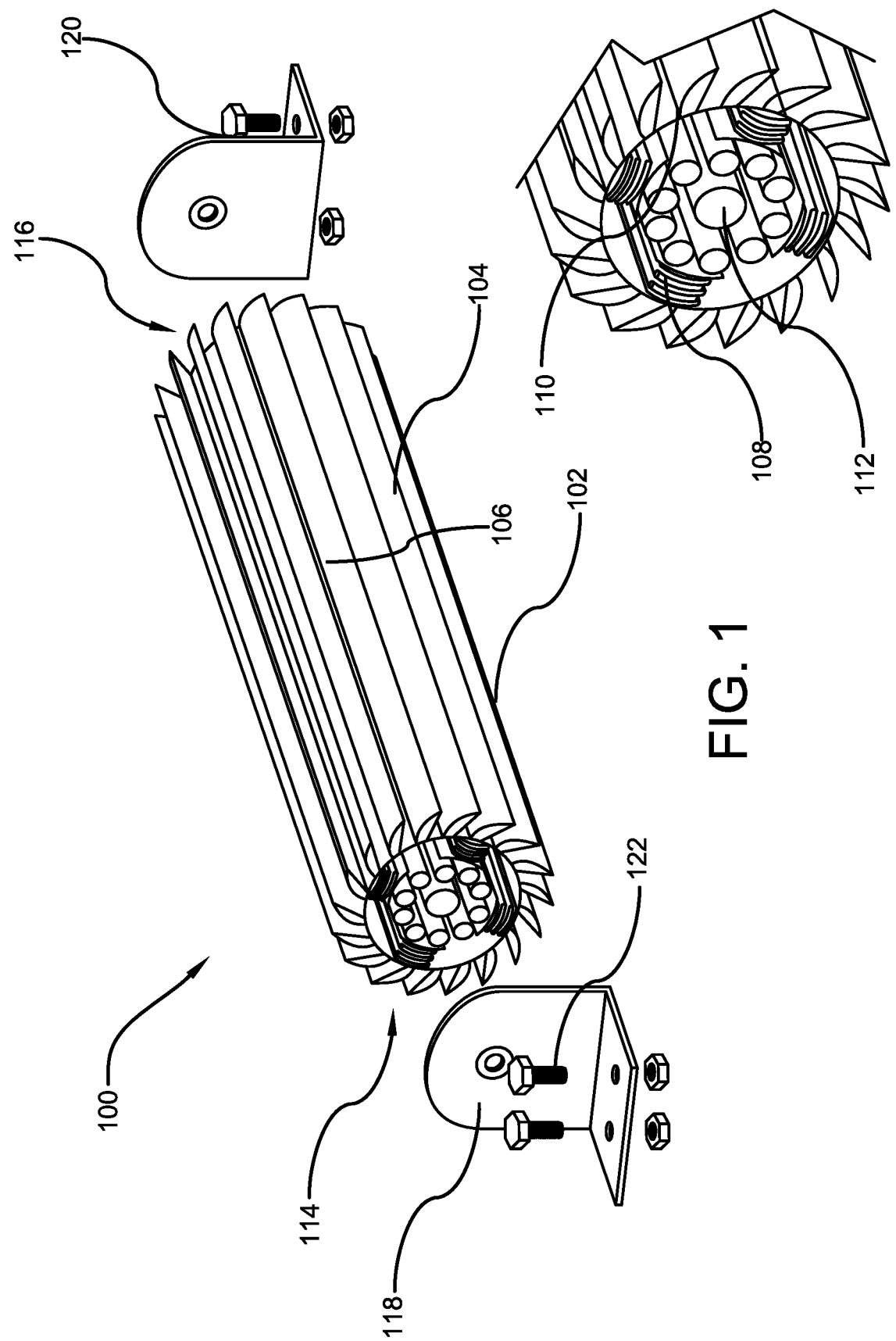
FIG. 1 illustrates a standalone view of the electric vehicle 12-Volt charger system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a charging device capable of charging 12-Volt circuits and system of an electric vehicle. There is also a long felt need in the art for a charging device that safely and effectively charges the 12-Volt battery of an electric vehicle. Additionally, there is a long felt need in the art for a 12-Volt system charging device for an electric vehicle that eliminates flow of electric current from a large battery pack of the electric vehicle to charge 12-Volt battery and accommodate 12-Volt circuits. Moreover, there is a long felt need in the art for a 12-Volt system charging device that reduces battery depletion to maintain optimal travel range for electric vehicles. Further, there is a long felt need in the art for an electric vehicle 12-Volt charger system that generates electricity to provide power to the 12-Volt system without requiring connection with large battery pack. Furthermore, there is a long felt need in the art for a charging device that can be integrated or retrofitted to any electric or hybrid vehicle. Finally, there is a long felt need in the art for an improved charging device for 12-Volt system of an electric vehicle that increases driving range (i.e., distance or time between charges) of electric vehicles by obviating dependency on large battery pack for accommodating 12-Volt systems and circuits.

The present invention, in one exemplary embodiment, is a 12-Volt system charging device for electric vehicles. The charging device has a cylindrical shaped fan assembly, the fan having a hollow body and including a plurality of blades extending radially outward from the exterior surface thereof; a generator armature disposed in the fan assembly and surrounded longitudinally by a generator winding, the inner surface of the fan assembly attached to the generator winding, wherein the fan assembly rotates along the armature when the vehicle is in motion for generating electricity.

Referring initially to the drawings, FIG. 1 illustrates a standalone view of the electric vehicle 12-Volt charger system of the present invention in accordance with the disclosed architecture. The charging system 100 is configured for charging EV's 12-Volt circuits and components including but not limited to the ECU, infotainment system, power door locks, power windows, HVAC fan, and safety systems including airbags and ADAS technology without receiving power from high power propulsion battery of the EV. The charging system 100 is regenerative and uses wind power for generating 12-Volt electricity that is used for recharging the 12-Volt battery of the EV and/or 12-Volt components and circuits. It is to be appreciated that the charging system 100 can generate 12-Volt and higher voltage system volts (i.e., in the range of 12 volts to 700 volts).

Figure 3:
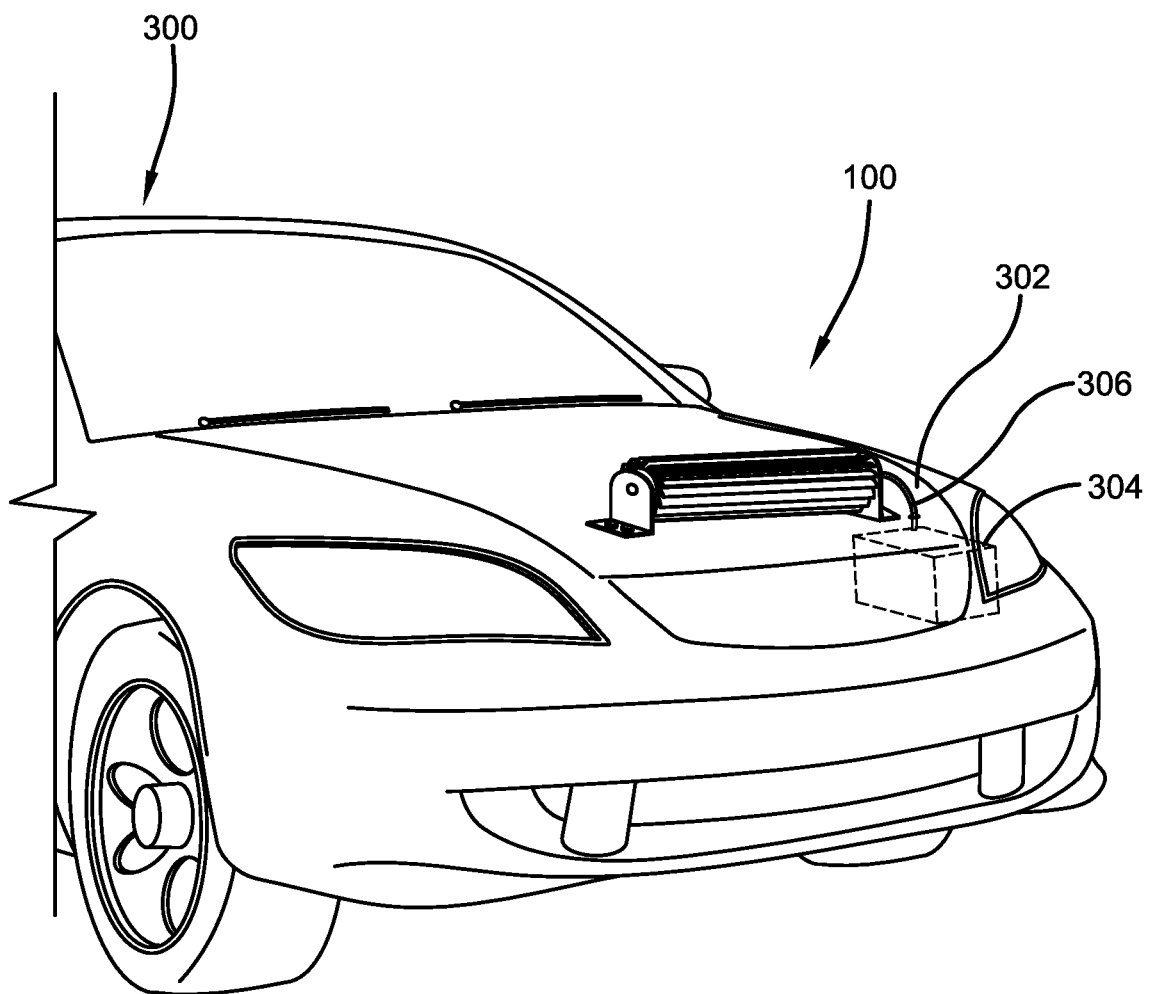
FIG. 3 illustrates a front perspective view of an electric vehicle with the installed regenerative charging device in accordance with the disclosed architecture.
Figure 4:
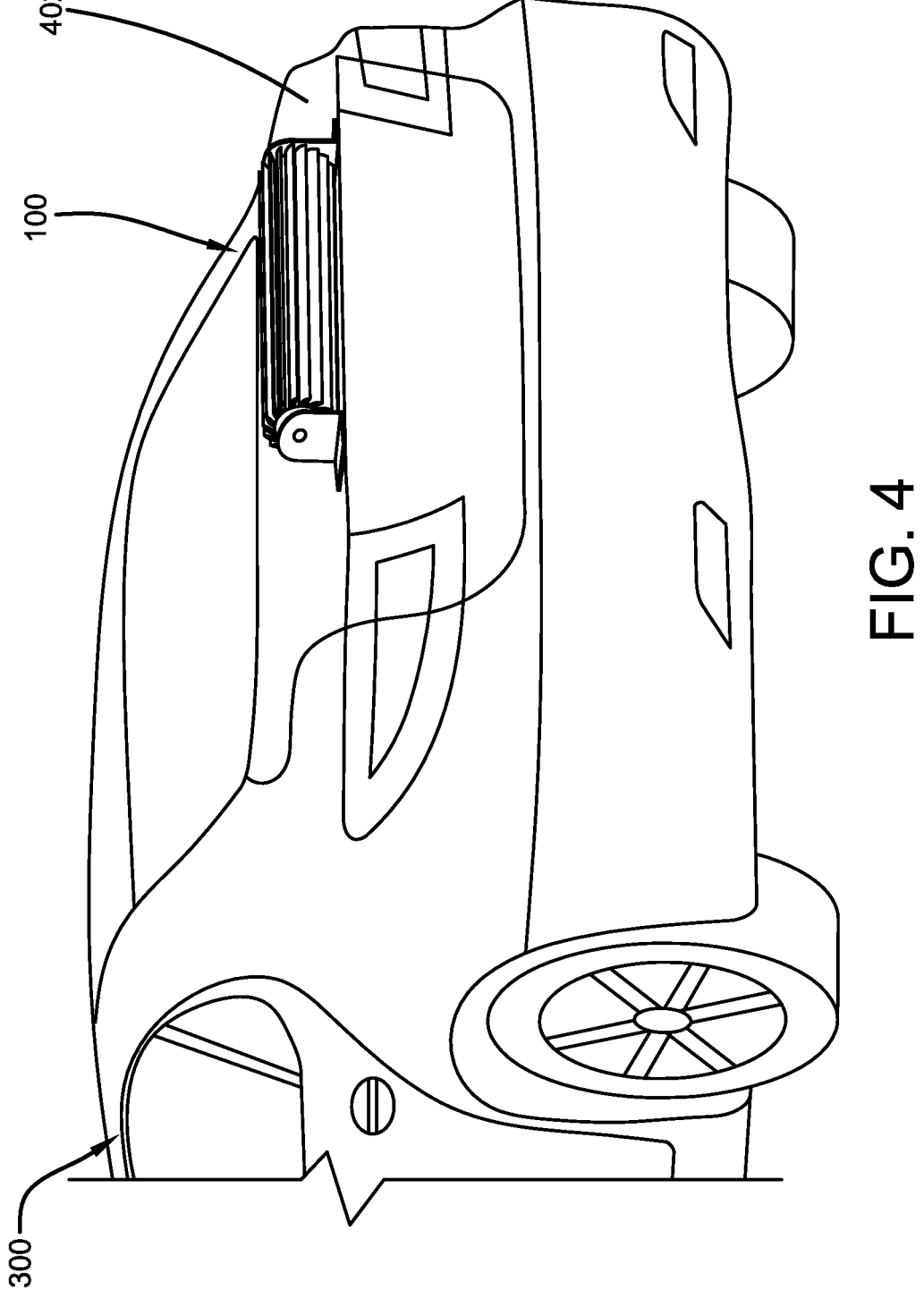
FIG. 4 illustrates a rear perspective view of the EV with the charging system installed in the spoiler of the trunk in accordance with the disclosed architecture.

More specifically, the regenerative charging system(s) 100 is positioned on an exterior surface of an electric vehicle as illustrated in FIGS. 3 and 4 of the present disclosure. The system 100 includes a cylindrical shaped longitudinal fan 102 having a plurality of blades or fins or blades 104 extending radially outwards from the outer surface 106 of the fan 102. Each fin has a length substantially equal to a length of the fan 102 and is substantially convex in curvature. A continuous generator winding 108 is positioned inside the hollow fan 102 and is attached to the inner surface 110 of the fan 102. The fins or blades 104 are configured to rotate along the fan 102 when the EV is in motion, thereby enabling the attached generator winding 108 to rotate. It is to be appreciated that the regenerative charging system(s) 100 can be installed in tandem with multiple chargers of similar types and size to generate additional voltage power to the system.

An armature 112 forms the central core of the fan 102 and is positioned inside the hollow body of the fan 102. The armature 112 runs or extends continuously between the opposite ends 114, 116 of the fan 102, and the fan 102 and the windings 108 rotate around the armature 112 for generating electricity configured for recharging 12-Volt circuits of the electric vehicle. The armature 112 remains static and is fixed to the brackets 118, 120. The brackets 118, 120 are configured to fix on the exterior surface of an electric vehicle using mechanical fasteners 122. During motion of the vehicle on which the charging device 100 is installed, the fins or blades 104 rotate resulting in rotation of windings 108 around armature 112. It is to be appreciated that the electric vehicle can be selected from a car, a truck, a locomotive, and more.

Internally, the system 100 is connected to the electric supply or battery of the 12-Volt circuit of the electric vehicle as illustrated in other embodiments of the present invention for providing the required 12-Volt electric charge. The turbine/fan 102 is made of lightweight aluminum and the brackets 118, 120 and mounting hardware including fasteners 122 are made of steel. The system 100 can be integrated into an electric vehicle during manufacturing of the vehicle and alternatively can also be retrofitted on the electric vehicle. In one exemplary embodiment, the armature 112 has a narrower diameter at the end 114 and has a larger diameter at the opposite end 116, wherein the fan 102 rotates around the larger diameter using a large ultra-smooth bearing which is 4-6 inches in diameter as illustrated in FIG. 2.

Figure 2:
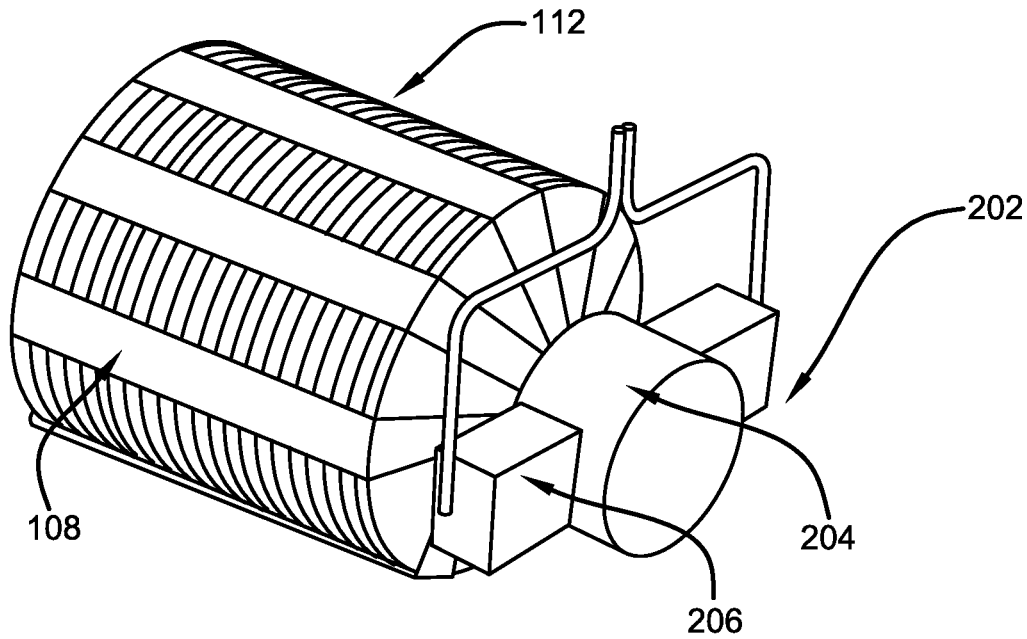
FIG. 2 illustrates an enlarged view of the armature and windings used in the regenerative charging system of the present invention in accordance with the disclosed architecture.

FIG. 2 illustrates an enlarged view of the armature and windings used in the regenerative charging system of the present invention in accordance with the disclosed architecture. The windings 108 in the form of copper wires are wrapped around the armature 112 enabling the rotating windings 108 to alter magnetic field in the path of the rotation thereof. The armature 112 is made of laminated steel sheets for decreasing magnetic losses and for providing a constant supply of 12-Volt supply to the electric vehicle. A commutator 204 is positioned to commute or relay the supply current to the winding 108 through the brushes 206 of DC motor.

The brushes 206 are made with carbon or graphite structures, making sliding contact over the rotating commutator 204. The brushes 206 are used to relay the current to the rotating commutator 204 from where it flows into the armature winding 108. The bearing 202 along with other connecting bearings (not shown) are ultra-smooth and allow for smooth rotation of the windings 108 and the fan 102. It is to be appreciated that the fan 102 rotates in conjunction with movement of the vehicle, however, the fan 102 can rotate (i.e., at a lower speed of rotation) while the vehicle is not moving (i.e., parked) in response to wind currents passing over the fan 102.

FIG. 3 illustrates a perspective view of the front of an electric vehicle with the installed regenerative charging device in accordance with the disclosed architecture. As illustrated, the charging system 100 is installed on the front section 302 of the electric vehicle (EV) 300 using the brackets 118, 120 such that the fins or blades 104 are configured to rotate in opposite direction of the motion of the EV 300 for producing electricity. The system 100 is also connected internally to the 12-Volt battery 304 of the EV 300 using internal circuit 306 enabling the system 100 to provide 12-Volt current to recharge the battery 304. In some embodiments, the system 100 can be connected to the electronic control unit (ECU) of the vehicle 300 for recharging and providing power to the 12-Volt circuits and/or battery 304 of the vehicle 300.

It should be noted that the system 100 works independently of the existing high power battery of the vehicle 300 and thus eliminates taking power from the main (high power) battery of the EV 300, thereby increasing the driving range of the EV 300. In the present embodiment, the system 100 can optionally be covered with a cover to maintain aesthetics of the vehicle 300.

FIG. 4 illustrates a perspective view of the rear of the EV 300 with the charging system 100 installed in the spoiler of the trunk in accordance with the disclosed architecture. In the present embodiment, the charging system 100 is retrofitted on the spoiler 402 of the vehicle 300. The system 100 is lightweight, easy to install and does create drag in the motion of the vehicle 300.

Figure 5:
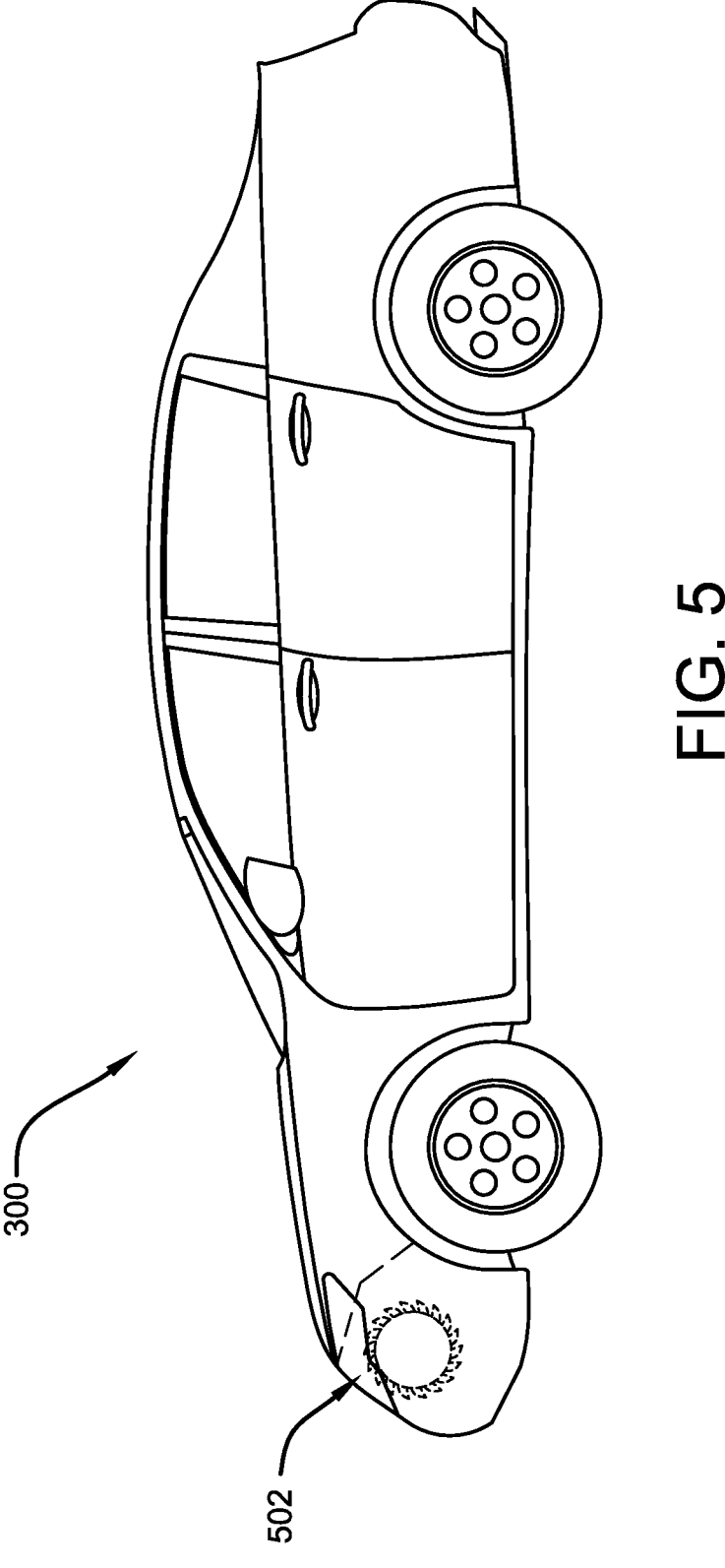
FIG. 5 illustrates a side perspective view of the EV with the charging system installed in the grill thereof in accordance with the disclosed architecture.

FIG. 5 illustrates a side perspective view of the EV 300 with the charging system 100 installed in the grill thereof in accordance with the disclosed architecture. In the present embodiment, the charging system 100 is positioned in the front grill 502 of the vehicle 300 and is integrated during the manufacturing of the vehicle 300. The system 100 in the present embodiment is not visible from outside and thus maintains the original aesthetics of the vehicle 300.

Figure 6:
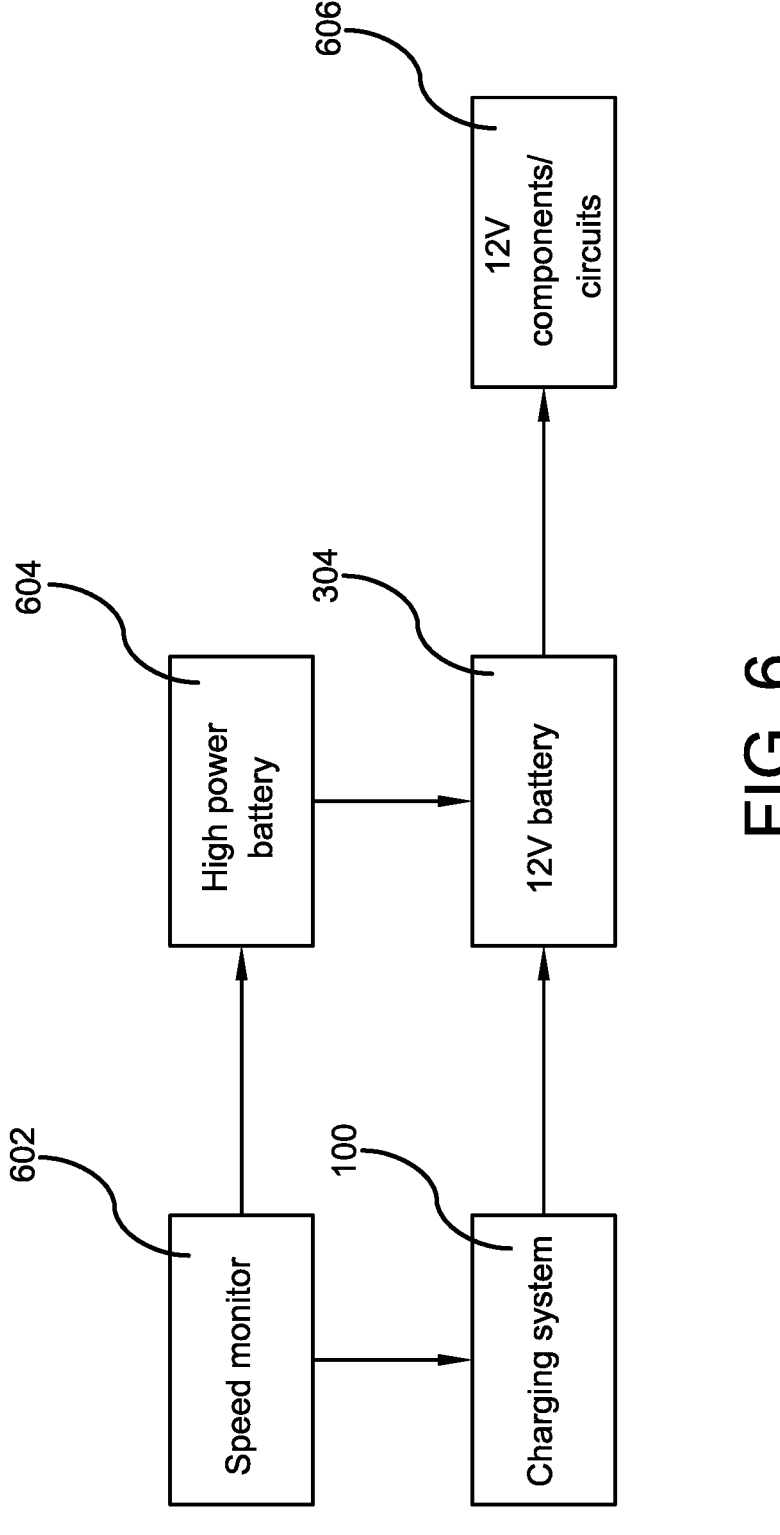
FIG. 6 illustrates a functional block diagram depicting a process of switching between the charging system of the present invention and the high-power battery system of the electric vehicle in accordance with the disclosed architecture.

FIG. 6 illustrates a functional block diagram depicting a process of switching between the charging system of the present invention and the high-power battery system of the electric vehicle in accordance with the disclosed architecture. The charging system 100 in one embodiment is connected to the speed monitor or odometer 602 of the vehicle and is configured to provide 12-Volt electric charge to the 12-Volt battery 304 when the odometer 602 indicates a speed above a predetermined threshold value. The predetermined threshold value can be 10 KM/HR or any other value depending on design of the vehicle.

When the speed monitor 602 indicates a zero-speed indicating that the vehicle is not in motion, then, an automatic switch from the charging system 100 to the high-power battery 604 of the vehicle enables the battery 604 to provide power to the 12-Volt battery 304. The 12-Volt battery 304 in conventional electric vehicles is configured to provide 12-Volt power to the necessary electric components 606 of the vehicle. It should be noted that the switch from the system 100 to the battery 604 takes place automatically, thereby ensuring a continuous supply of 12-Volt power to recharge the 12-Volt battery 304.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "electric vehicle 12-Volt charger system", "charging system", "regenerative charging system", and "system" are interchangeable and refer to the electric vehicle renewable 12-Volt charger system 100 of the present invention.

Notwithstanding the forgoing, the electric vehicle renewable 12-Volt charger system 100 of the present invention can be of any suitable size and configuration as is known in the art without affecting the overall concept of the invention, provided that it accomplishes the above stated objectives. One of ordinary skill in the art will appreciate that the electric vehicle renewable 12-Volt charger system 100 as shown in the FIGS. is for illustrative purposes only, and that many other sizes and shapes and steps for the electric vehicle renewable 12-Volt charger system 100 are well within the scope of the present disclosure. Although the dimensions and configuration of the electric vehicle renewable 12-Volt charger system 100 are important parameters for user convenience, the electric vehicle renewable 12-Volt charger system 100 may be of any size that ensure optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A charging system for recharging an electric vehicle's 12-Volt circuits, the charging system comprising:

a regenerative charging system having a wind capturing device;

wherein said wind capturing device uses wind power for generating 12-Volt electricity used for the recharging of a 12-Volt battery and 12-Volt circuits of an electric vehicle (EV);

wherein said wind capturing device is mounted to the electric vehicle for capturing movement of air therethrough while the electric vehicle is moving at a predetermined speed;

wherein said wind capturing device having a cylindrical longitudinal fan including a plurality of blades extending radially outwards from an outer surface of a hollow body;

wherein each of said plurality of blades is convex in curvature and having a length substantially equal to a length of said longitudinal fan;

a continuous generator winding positioned inside said hollow body and attached to an inner surface of said longitudinal fan;

wherein said longitudinal fan having an inner central core including an armature positioned inside said hollow body of said longitudinal fan;

wherein said armature extends continuously between opposing ends of said longitudinal fan;

wherein said blades and said generator winding rotate around said armature when the EV is in motion to generate electricity current;

wherein said regenerative charging system is connected to the 12-Volt battery of the electric vehicle with an internal circuit to supply the 12-Volt battery said electricity current; and further wherein said electricity current recharges the 12-Volt circuits of the electric vehicle.

2. The charging system for recharging an electric vehicle's 12-Volt circuits of claim 1, wherein said 12-Volt circuits include components selected from the group consisting of an ECU, an infotainment system, a power door lock, a power window, an HVAC fan, and an airbag.

3. The charging system for recharging an electric vehicle's 12-Volt circuits of claim 2, wherein said hollow body and said blades include a material of aluminum.

4. The charging system for recharging an electric vehicle's 12-Volt circuits of claim 3, wherein said armature includes a first diameter at a first end and a second diameter at a second end; and further wherein said first diameter is less than said second diameter.

5. The charging system for recharging an electric vehicle's 12-Volt circuits of claim 4, wherein said armature having copper wire windings wrapped around said armature for altering a magnetic field in a path of the rotation.

6. The charging system for recharging an electric vehicle's 12-Volt circuits of claim 5, wherein said armature having laminated steel sheets for decreasing magnetic losses.

7. The charging system for recharging an electric vehicle's 12-Volt circuits of claim 6, wherein said armature having a commutator to relay said electricity current to said copper wire windings through a plurality of brushes of a DC motor.

8. The charging system for recharging an electric vehicle's 12-Volt circuits of claim 7, wherein said plurality of brushes including a material selected from a group consisting of a carbon and a graphite.

9. The charging system for recharging an electric vehicle's 12-Volt circuits of claim 7, wherein said plurality of brushes making sliding contact over said commutator during rotation of said longitudinal fan.

10. The charging system for recharging an electric vehicle's 12-Volt circuits of claim 9, wherein said regenerative charging system is installed on a front section of the electric vehicle; and further wherein said longitudinal fan rotates in an opposite direction of a motion of the electric vehicle.

11. The charging system for recharging an electric vehicle's 12-Volt circuits of claim 9, wherein said regenerative charging system is installed on a rear section of the electric vehicle; and further wherein said longitudinal fan rotates in an opposite direction of a motion of the electric vehicle.

12. The charging system for recharging an electric vehicle's 12-Volt circuits of claim 9, wherein said regenerative charging system is installed within a front grill of the electric vehicle; and further wherein said longitudinal fan rotates in an opposite direction of a motion of the electric vehicle.

13. A charging system for recharging an electric vehicle's 12-Volt circuits, the charging system comprising:

a regenerative charging system having a wind capturing device;

wherein said wind capturing device uses wind power for generating 12-Volt electricity used for the recharging of 12-Volt circuits of an electric vehicle (EV);

wherein said wind capturing device is mounted to the electric vehicle for capturing movement of air therethrough while the electric vehicle is moving at a predetermined speed;

wherein said wind capturing device having a cylindrical longitudinal fan including a plurality of blades extending radially outwards from an outer surface of a hollow body;

wherein each of said plurality of blades is convex in curvature and having a length substantially equal to a length of said longitudinal fan;

a continuous generator winding positioned inside said hollow body and attached to an inner surface of said longitudinal fan;

wherein said longitudinal fan having an inner central core including an armature positioned inside said hollow body of said longitudinal fan;

wherein said armature extends continuously between opposing ends of said longitudinal fan;

wherein said blades and said generator winding rotate around said armature when the EV is in motion to generate electricity current;

wherein said regenerative charging system is connected to the 12-Volt circuits of the electric vehicle with an internal circuit to supply the 12-Volt circuits said electricity current; and further wherein said predetermined speed is at least 10 KM/HR.

14. The charging system for recharging an electric vehicle's 12-Volt circuits of claim 13, wherein said 12-Volt circuits include components selected from the group consisting of an ECU, an infotainment system, a power door lock, a power window, an HVAC fan, and an airbag.

15. The charging system for recharging an electric vehicle's 12-Volt circuits of claim 13, wherein said armature includes a first diameter at a first end and a second diameter at a second end, and further wherein said first diameter is less than said second diameter.

16. The charging system for recharging an electric vehicle's 12-Volt circuits of claim 13, wherein said armature having copper wire windings wrapped around said armature for altering a magnetic field in a path of the rotation.

17. The charging system for recharging an electric vehicle's 12-Volt circuits of claim 13, wherein said armature having a commutator to relay said electricity current to copper wire windings through a plurality of brushes of a DC motor.

18. The charging system for recharging an electric vehicle's 12-Volt circuits of claim 13, wherein said regenerative charging system is installed on a front section or a rear section of the electric vehicle, and further wherein said longitudinal fan rotates in an opposite direction of a motion of the electric vehicle.

19. The charging system for recharging an electric vehicle's 12-Volt circuits of claim 13, wherein said regenerative charging system is installed within a front grill of the electric vehicle, and further wherein said longitudinal fan rotates in an opposite direction of a motion of the electric vehicle.

20. A charging system for recharging an electric vehicle's 12-Volt circuits, the charging system comprising:

a regenerative charging system having a wind capturing device;

wherein said wind capturing device uses wind power for generating 12-Volt electricity used for the recharging of 12-Volt circuits of an electric vehicle (EV);

wherein said wind capturing device is mounted to the electric vehicle for capturing movement of air therethrough;

wherein said wind capturing device having a cylindrical longitudinal fan including a plurality of blades extending radially outwards from an outer surface of a hollow body;

wherein each of said plurality of blades is convex in curvature and having a length substantially equal to a length of said longitudinal fan;

a continuous generator winding positioned inside said hollow body and attached to an inner surface of said longitudinal fan;

wherein said longitudinal fan having an inner central core including an armature positioned inside said hollow body of said longitudinal fan;

wherein said armature extends continuously between opposing ends of said longitudinal fan;

wherein said blades and said generator winding rotate around said armature when the movement of air rotates said generator winding to generate electricity current;

wherein said regenerative charging system is connected to the 12-Volt circuits of the electric vehicle with an internal circuit to supply the 12-Volt circuits said electricity current;

wherein said 12-Volt circuits include components selected from the group consisting of an ECU, an infotainment system, a power door lock, a power window, an HVAC fan, and an airbag;

wherein said armature having copper wire windings wrapped around said armature for altering a magnetic field in a path of the rotation; and further wherein said armature having a commutator to relay said electricity current to said copper wire windings through a plurality of brushes.

\* \* \* \* \*